United States Patent [19]
Weaver

[11] Patent Number: 5,489,957
[45] Date of Patent: Feb. 6, 1996

[54] FILM CURL ELIMINATION APPARATUS

[75] Inventor: David J. Weaver, Rochester, N.Y.

[73] Assignee: Eastman Kodak Company, Rochester, N.Y.

[21] Appl. No.: 276,388

[22] Filed: Jul. 18, 1994

[51] Int. Cl.$^6$ ..................................................... G03B 1/18
[52] U.S. Cl. ................................................... 354/173.11
[58] Field of Search ............................ 354/173.1, 173.11

[56] References Cited

U.S. PATENT DOCUMENTS

| | | | |
|---|---|---|---|
| 1,527,285 | 2/1925 | Thalhammer | 354/212 |
| 1,725,460 | 8/1929 | Lessler et al. | 354/212 |
| 2,312,887 | 3/1943 | Ericksson | 354/212 |
| 2,539,322 | 1/1951 | Platt . | |
| 2,742,834 | 4/1956 | Kondolf | 354/212 |
| 2,835,178 | 5/1959 | Montremy | 354/212 |
| 3,377,936 | 4/1968 | Goshima et al. | 95/31 |
| 3,379,363 | 4/1968 | Sutphen, Jr. | 229/85 |
| 4,279,486 | 7/1981 | Ogawa . | |
| 4,572,635 | 2/1986 | Tsuzuki et al. | 354/212 |
| 4,720,721 | 1/1988 | Hamada et al. | 354/212 |
| 4,887,110 | 12/1989 | Harvey | 354/275 |
| 4,991,786 | 2/1991 | Cloutier et al. | 242/71.100 |
| 5,089,833 | 2/1992 | Takahashi et al. | 354/105 |
| 5,300,975 | 4/1994 | Kanishige | 354/173.11 |
| 5,323,197 | 6/1994 | Alligood | 354/173.1 |
| 5,325,144 | 6/1994 | Yoshikawa et al. | 354/319 |
| 5,341,187 | 8/1994 | Kurei | 354/173.11 |
| 5,398,091 | 4/1995 | Hershberger | 354/203 |

*Primary Examiner*—Michael L. Gellner
*Assistant Examiner*—Daniel G. Chapik
*Attorney, Agent, or Firm*—Peter J. Bilinski

[57] ABSTRACT

Apparatus in a photographic camera for moving an exposed section of a filmstrip loaded into a camera from the exposure gate to a curl-developing area located along the film transport path after a predetermined period of camera inactivity as measured by an included timing circuit so as to prevent the onset of a reverse curl. According to the invention, the apparatus includes a control mechanism for automatically advancing a succeeding unexposed film portion to the exposure gate upon reactivation of the camera.

5 Claims, 6 Drawing Sheets

FILM CURL ELIMINATION APPARATUS

FIELD OF THE INVENTION

The invention relates generally to the field of photography, and in particular to apparatus for a photographic camera for minimizing the development of film curl on unexposed sections of a loaded filmstrip.

BACKGROUND OF THE INVENTION

In known conventional photographic cameras, a filmstrip is advanced in a frame-by-frame manner along a transport path from a film cartridge to an exposure gate where the film can be exposed. The filmstrip is then advanced from the exposure gate onto a take-up spool, which is oppositely situated across the exposure gate from the film cartridge. In other known cameras, the filmstrip is initially prewound onto the take-up spool prior to exposing the film at the exposure gate, where it is eventually advanced into the film cartridge. In either of the above cameras, the filmstrip has a developed curvature occurring from the disposition of the filmstrip onto the spool of the cartridge or of the take-up spool. This curvature is alleviated sufficiently by means of a pressure plate which allows the filmstrip to lie flat when the filmstrip is presented at the exposure gate. A problem, however, which is common to both types of known cameras described above is the tendency of an unexposed portion of the filmstrip to develop a reverse set, or curl, which is opposite in nature from the type of curl common to filmstrips used in photographic cameras. This reverse curling typically develops in a transition area which is situated along the film transport path between the film cartridge chamber of the camera and the exposure gate (or, in the case of prewound cameras between the take-up spool chamber and the exposure gate). This reverse form of curling generally occurs after a period of camera inactivity in which the unexposed section of the filmstrip remains in the transition area. In addition to the amount of time the unexposed section of the filmstrip remains in the described transition area, environmental conditions, such as temperature and humidity, also affect the onset of a reverse curl. The end result is that the unexposed section of the filmstrip will not lie sufficiently flat despite the use of conventional pressure plates when the filmstrip is finally advanced by the camera into the exposure gate, creating a defocused image on the film and consequently, a blurred image on a processed print.

U.S. Pat. No. 4,720,721 describes a film advancing mechanism for a camera which moves a portion of unexposed film which has already developed a reverse form of curl beyond the exposure gate so that the curled film is not then exposed. As is apparent, this mechanism helps to avoid the taking of defocused pictures due to the onset of the reverse curling effect, but in the process a number of potential exposures (frames of film) can be wasted.

There is a need, therefore, to provide a camera having a film transport mechanism which minimizes the reverse curling effect on unexposed sections of a filmstrip by proactively preventing that occurrence.

SUMMARY OF THE INVENTION

The present invention is directed to overcoming one or more of the problems set forth above. Briefly summarized, according to one aspect of the present invention, there is provided a photographic camera wherein successive unexposed sections of a filmstrip are exposed, characterized by:

time determining means for determining a predetermined period of camera inactivity; and film moving means for moving an unexposed film section from a curl-developing area to a curl-defeating area after a predetermined amount of camera inactivity as determined by the time-determining means.

An advantageous feature of the present invention is that the effects of heat, humidity, and time on unexposed sections of the filmstrip are minimized by allowing unexposed sections of the filmstrip to be moved from a transition area in which a permanent reverse curl will likely develop to another location along the film transport path where curling is not likely to occur after a predetermined period of camera inactivity, such as by rewinding the unexposed film portion back into the film cartridge chamber.

According to a preferred embodiment of the present invention, the camera includes film advancing means for automatically advancing an unexposed film section which was previously removed from the transition, or curl-developing area, into the exposure gate upon reactivation of the camera.

These and other aspects, objects, features and advantages of the present invention will be more clearly understood and appreciated from a review of the following Detailed Description of the Preferred Embodiments and appended claims, and by reference to the accompanying drawings.

DETAILED DESCRIPTION OF THE INVENTION

Figure 1:
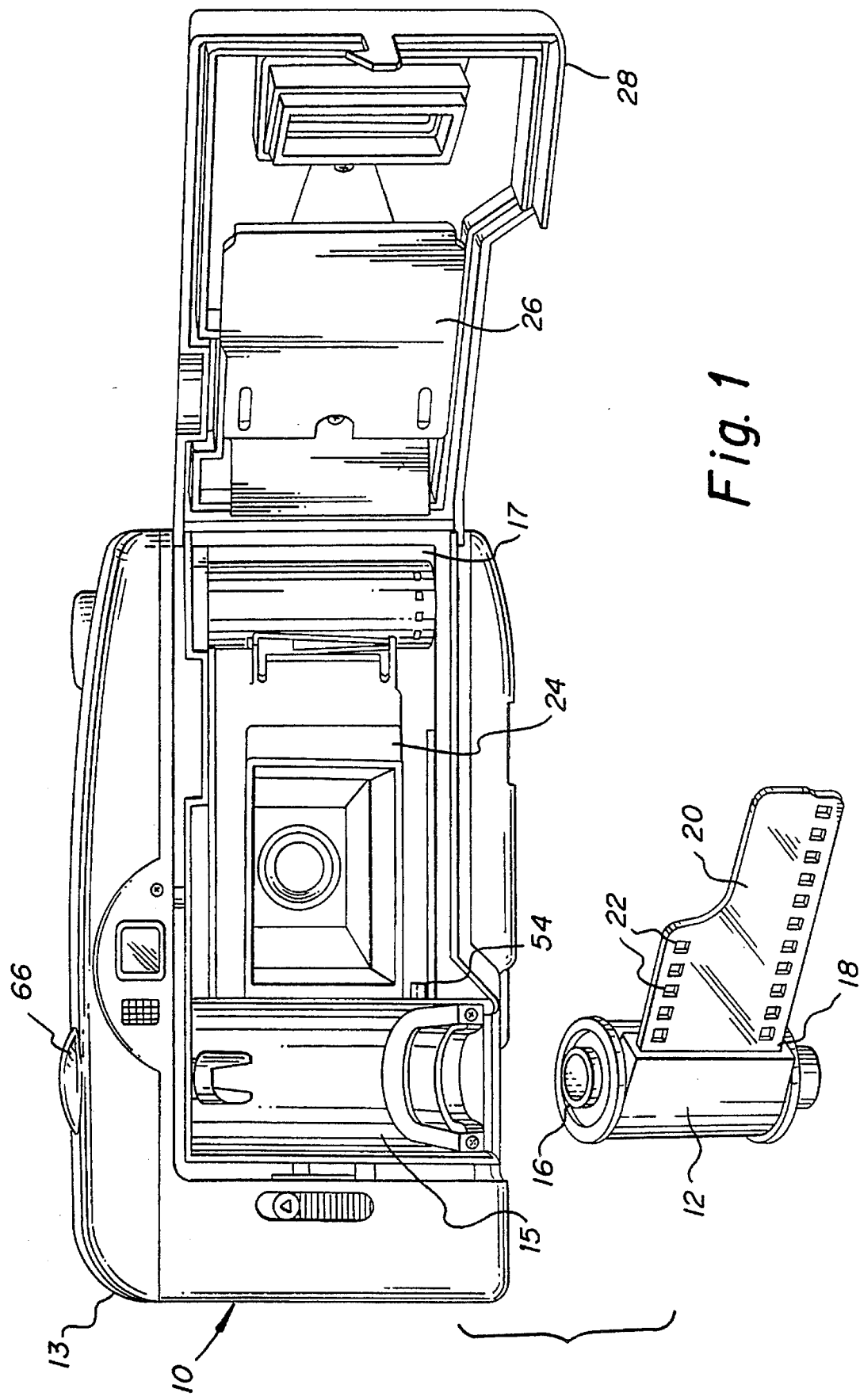
FIG. 1 is a partial perspective view of a camera according to a preferred embodiment of the present invention.

Beginning with FIG. 1, a camera 10 is provided having a film cartridge 12 and a take-up spool 14 arranged within oppositely disposed chambers 15, 17 in a plastic body 13. The film cartridge 12 contains a rotatable spool 16 onto which a filmstrip 20 is wound and is advanced through an egress opening 18 so as to allow the advancement of the filmstrip, as is conventionally known. A conventional 35 mm filmstrip 20 is provided in the film cartridge 12 having edge perforations 22 for engaging with pawls which depend from the take-up spool 14 for allowing the filmstrip to be taken up as it is advanced from the cartridge 12. An exposure gate 24 is situated between the film cartridge chamber 15 and the take-up chamber 17 and is sized to expose a frame of the filmstrip 20 in a manner which is conventionally known in the field. A pressure plate 26 is attached to the camera back cover 28 for placement over the advanced filmstrip 20 at the exposure gate 24 when the camera back cover is closed so as to support a to-be-exposed film portion. A photosensor 54, or other film detection means, is preferably positioned adjacent the exposure gate 24, for detecting the presence of the filmstrip 20, as described in greater detail herein. The photosensor 54 is conventional, being an infrared emitter/detector pair.

Figure 2A:
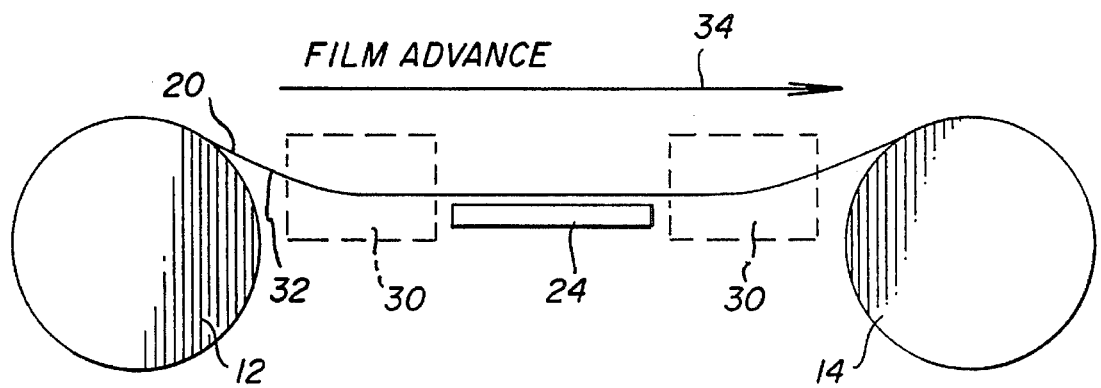
FIGS. 2(a) and 2(b) are schematic diagrams illustrating the film transport path for the camera of FIG. 1 and for a prewound camera, respectively, depicting the transition areas in which reverse curling of a loaded filmstrip may occur.
Figure 2B:
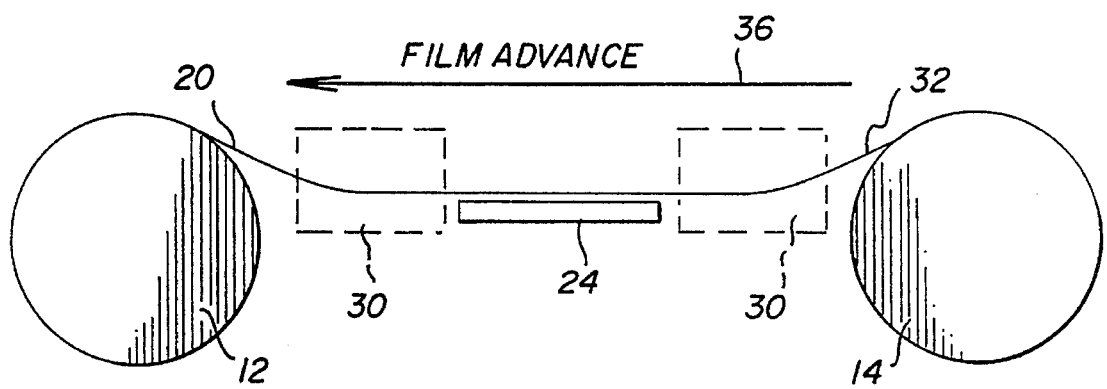

FIGS. 2(a) and 2(b) illustrate schematically the film transport paths 32 for a normal wind and a prewound camera, and the direction of film advancement for each as labeled by arrows 34, 36. As is apparent from each of these FIGS., the filmstrip 20 develops a natural preset curl from laying on the spool 16 of the film cartridge 12 (or in the case of prewound cameras, the take-up spool 14) which is essentially in a downward or concave direction. A pair of transition areas 30 forming part of each film transport path 32 are found between the exposure gate 24 and the film cartridge 12 within the cartridge chamber 15, and the exposure gate and the take-up spool 14 as situated in the take-up chamber 17 of the camera, respectively. In each transition area 30 the filmstrip 20 lies unsupported, thereby providing an opportunity for the filmstrip to develop a reverse set, or curl, that is opposite in nature to the typical concavity which the filmstrip develops.

Figure 3:
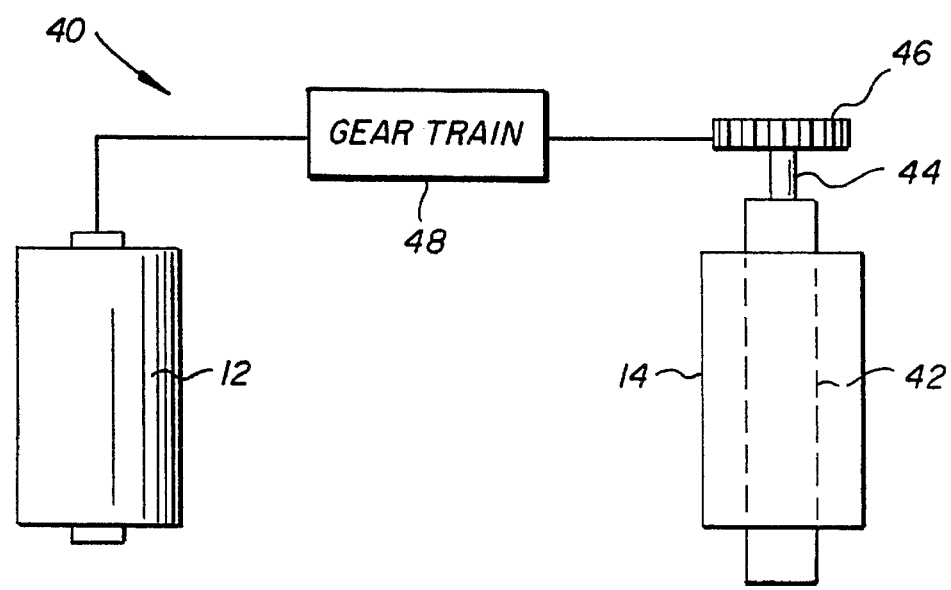
FIG. 3 is a schematic view of a film advancing mechanism for the camera of FIG. 1.

Referring now to the schematic of FIG. 3, the camera 10 includes a motorized film advancing mechanism 40 for advancing the filmstrip 20 in a frame-by-frame manner across the exposure gate 24 from the film cartridge 12 to the take-up spool 14, and for rewinding the filmstrip 20 back into the film cartridge after exposure. The film advancing mechanism 40 includes a bidirectional motor 42 which is located within the take-up spool 14, having an output shaft 44 attached to a pinion gear 46. A gear train 48 interconnects with the take-up spool 14 and the film cartridge 12 for moving the filmstrip 20 in either a winding or rewinding direction along the film transport path 32. The particular film transport mechanism of the camera does not form a part of the present invention, other than the mechanism provide capability of both advancing and retracting film in the camera. Additional details as to the operation of the gear train and other features of a typical motorized film transport mechanism are described in commonly assigned U.S. Pat. No. 5,323,197, entitled AN APPARATUS FOR TRANSPORTING PHOTOGRAPHIC FILM, which is hereby incorporated by reference.

Figure 4:
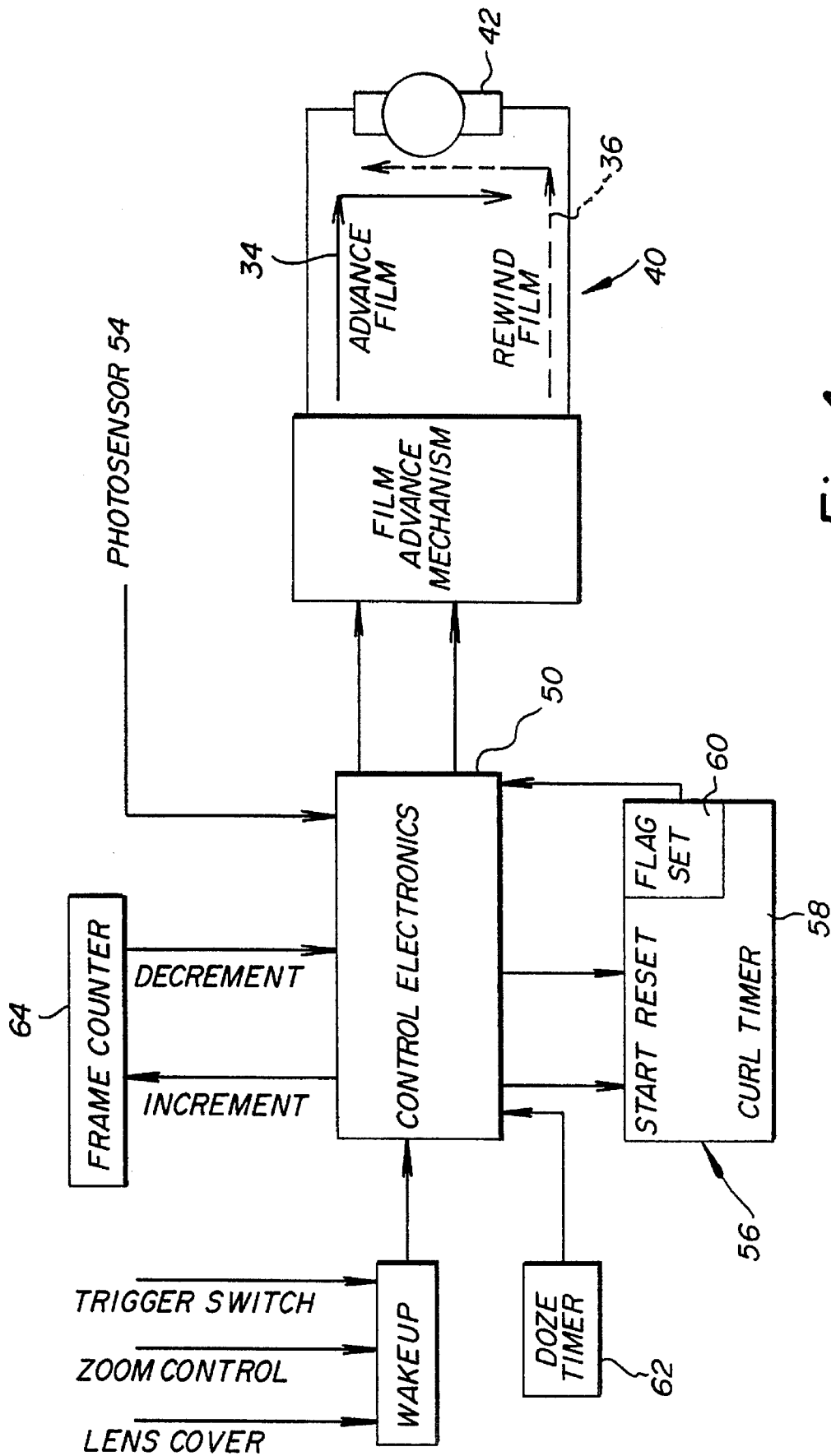
FIG. 4 is a schematic electrical diagram according to the present invention.

Referring now to the electrical schematic diagram of FIG. 4, the camera 10 is equipped with a controller 50 that is interconnected to the film advancing mechanism 40, as well as to the photosensor 54 which is positioned along the film transport path 32, FIG. 2(a), and conveniently adjacent the exposure gate 24, FIG. 1, to detect the presence of the filmstrip 20 therein. The controller 50 is a microprocessor, preferably having EEPROM which is further connected to a frame counter 64 which can be incremented and decremented to indicate to the user the number of exposures taken by the camera. In addition, the controller 50 is also connected to a curl timing circuit 56 which includes an internal curl timer 58 which can be set to provide a signal via a time-out flag 60 to the camera controller 50 after a predetermined period of camera inactivity, as is described in greater detail below. In this particular embodiment, the predetermined period is about 24 hours, though any convenient length of time can be input into the timing circuit 56, depending on the type of filmstrip being used, as well as the environmental conditions in which the camera 10 is being used.

The controller 50 is preferably programmed to set the camera 10, FIG. 1, into a dormant or doze or mode which allows the powered components of the camera to be shut down after a brief period of camera inactivity (typically about three minutes).

Typically, the closure of the camera lens cover (not shown) by the user closes a switch (not shown) sending a signal to the controller 50. The signal as received by the controller 50 activates a doze onset timer 62 connected thereto for triggering the doze mode of the camera 10 after a predetermined period of camera inactivity (typically three minutes is a convenient period, though this period can be easily varied). When the doze timer 62 reaches the three minute period of inactive use, a signal is sent to the controller 50 which is programmed to set the camera 10 in the doze mode. The controller 50 then automatically shuts down the powered components of the camera 10 in order to conserve battery power, with the exception of the timing circuit 56, for reasons detailed below. The actual powering down of the camera 10 into the doze mode is conventionally known in the photographic field to those skilled in the art and does not form a part of the present invention, except where specifically indicated herein.

Figure 5:
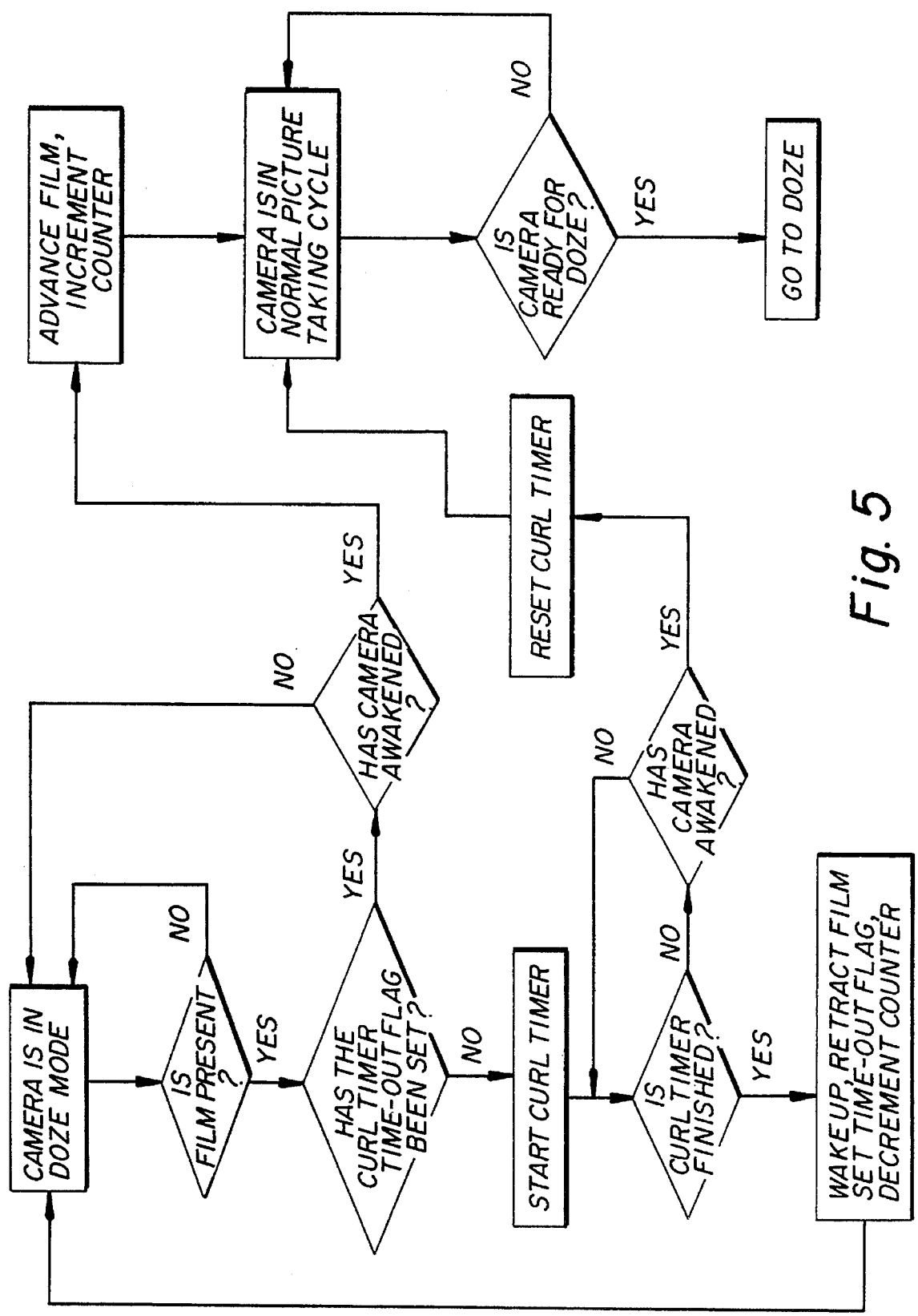
FIG. 5 is a logic diagram illustrating a method of operation according to the embodiment of FIGS. 1–4.

Referring to the logic diagram in FIG. 5, the method of operation of the present invention will now be described with respect to a normal wind camera, FIG. 2(a). Upon closure of the lens cover (not shown) or other known means for triggering the doze timer 62, the camera 10 is placed in the doze mode by the controller 50 after three minutes have elapsed. The controller 50 is programmed to then determine whether a portion of the filmstrip 20 is present in the exposure gate 24 by activating the photosensor 54. If no film is present in the exposure gate 24, the emitted optical beam of the photosensor 54 is not reflected back for detection and no signal is provided to the controller 50. If no signal is received by the controller 50, then the camera 10 remains in the doze mode until reactivation (or wake-up) by the user, such as by opening of the camera lens cover (not shown).

However, if a film portion is detected by the photosensor 54 in the exposure gate 24, that is, the emitted IR beam is reflected back for detection by the photosensor 54, then a signal is sent to the controller 50. Upon the receipt of a detection signal by the photosensor 54, the logic of the controller 50 then determines whether the time-out flag 60 of the curl timing circuit 56 has been tripped; indicating that a signal has already been sent to the controller 50 causing the camera 10 to have already retracted the unexposed sections of the filmstrip 20 from the transition area 30 and the exposure gate 24, as described below. If the time-out flag 60 has not previously been set, then the controller 50 is programmed to send a signal to the timing circuit 56 activating the curl timer 58 which is set to trip the time-out flag 60 after a predetermined period of camera inactivity. A period of 24 hours is conveniently selected, though any convenient time period may be selected, depending on the type of filmstrip, environmental conditions, etc.

Referring to FIGS. 4, 5 and 6(a)–(c), and when the curl timer 58 indicates that the predetermined period of camera inactivity has elapsed, the time-out flag 60 is tripped. The tripping of the time-out flag 60 provides a signal which is then communicated to the controller 50. In response, the logic of the controller 50 automatically and temporarily awakens the camera 10 by sending a signal to the film advancing mechanism 40, activating the bidirectional motor 42, causing the motor to rotate in a rewinding direction, as shown by arrow 36, FIG. 4, so as to retract both the unexposed frame (indicated by frame 6) in the exposure gate 24, as well as the portion of unexposed filmstrip in the transition area 30 (frame 7) back into the film cartridge 12. For simplicity of explanation, the transition area 30 of the described example is sized so as to fit a single frame of the filmstrip 20. Because the width of the transition area 30 is easily varied according to the size of the camera used, the logic of the controller 50 can be structured in accordance with that dimension so as to retract the frame of the filmstrip 20 within the exposure gate 24, plus the additional length of filmstrip located in the transition area, whatever that might be.

Figure 6A:
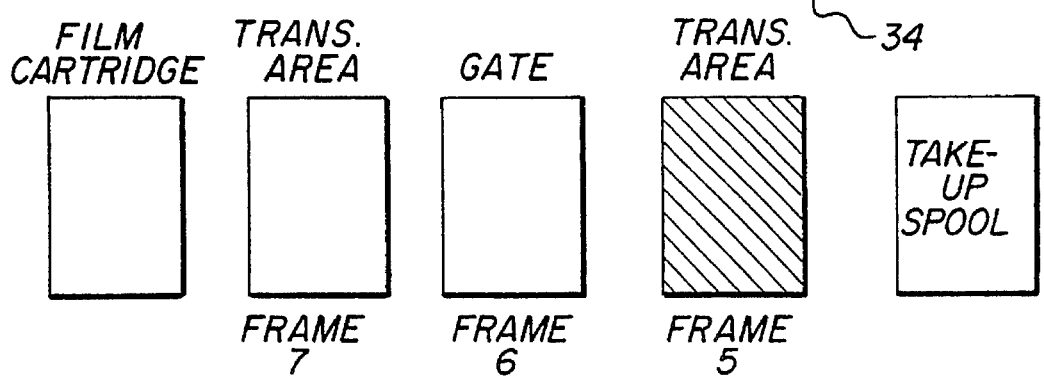
FIGS. 6(a), 6(b), and 6(c) are time-phased views of filmstrip advancement in the exposure gate of the camera shown in FIG. 1 taken over several active and inactive periods of the camera.
Figure 6B:
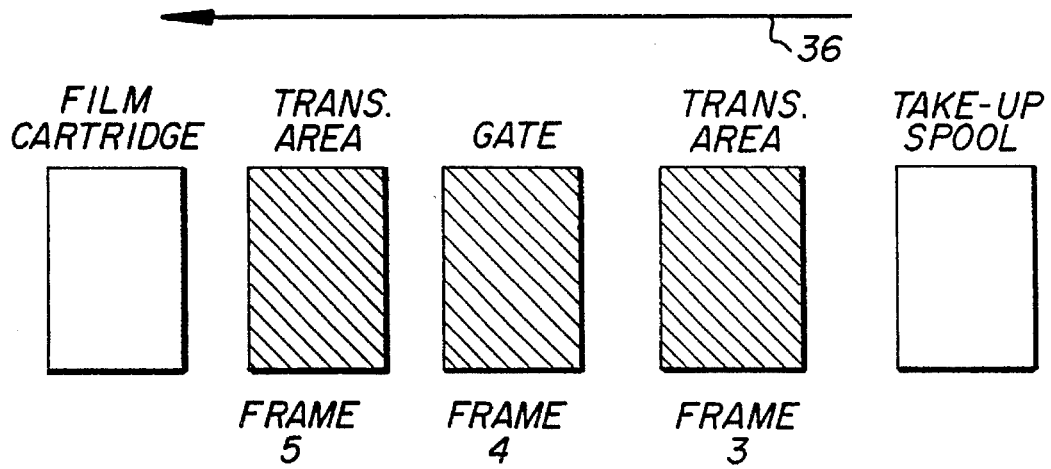
Figure 6C:
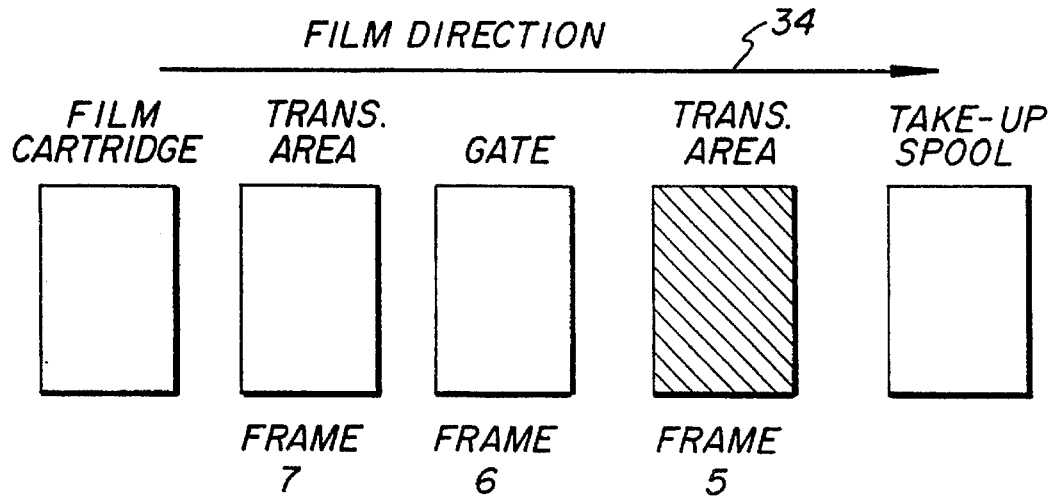
Figure 7A:
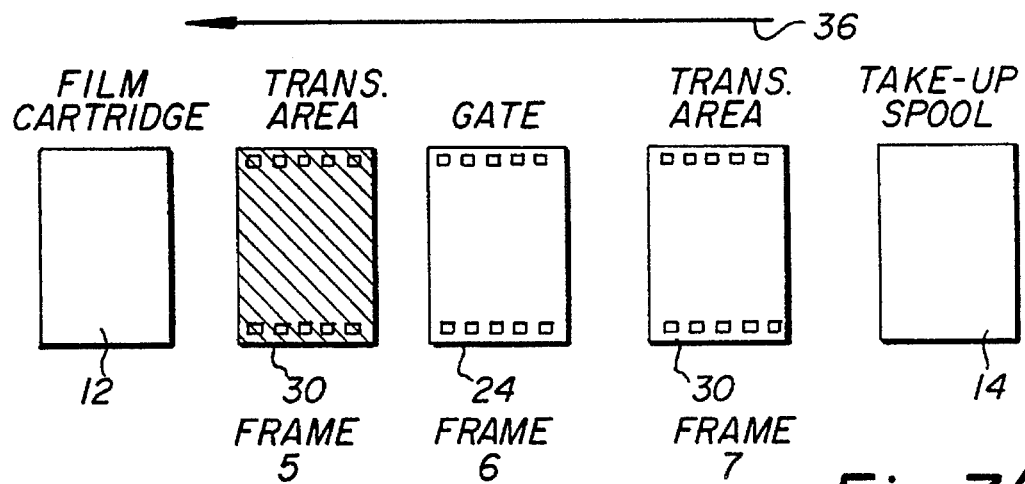
FIGS. 7(a), 7(b), and 7(c) are time-phased views of a filmstrip advanced in a prewound camera as taken over several active and inactive periods of the camera.
Figure 7B:
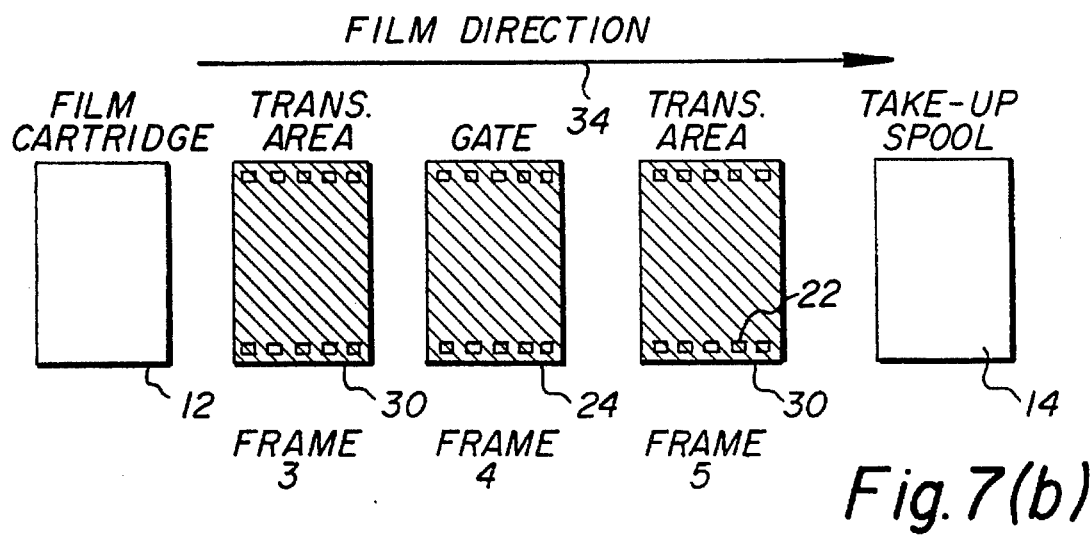
Figure 7C:
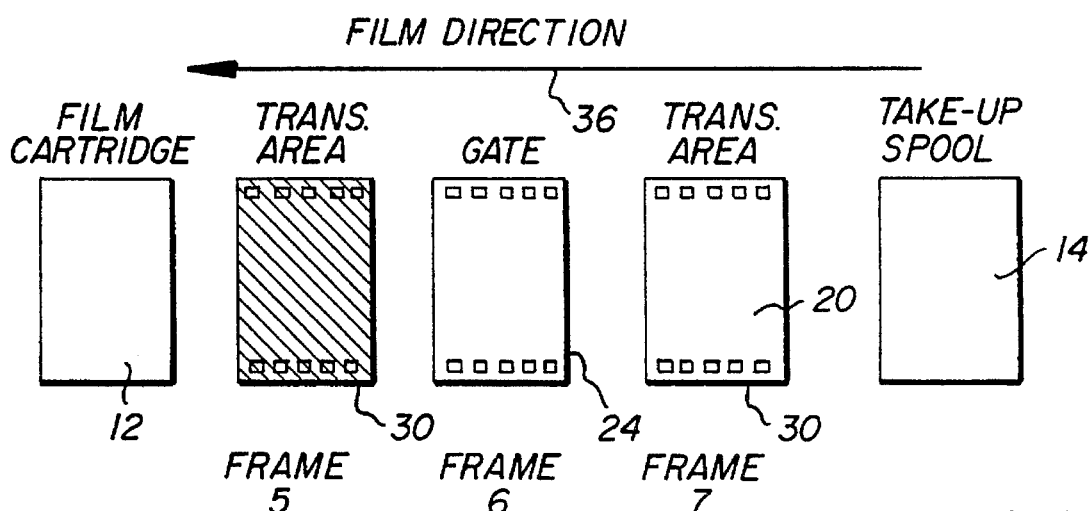

As is apparent from FIGS. 6(a)–6(c), the retraction of the filmstrip 20 rewinds the unexposed section (indicated by frames 6 and 7) of the filmstrip 20 out of the transition area 30 and exposure gate 24, respectively, and into the confines of the film cartridge 12. Previously exposed frames 4 and 5 are now positioned in the exposure gate 24 and the transition area 30, respectively. The movement of the filmstrip 20 is coordinated by the photosensor 54 which signals the number of edge perforations 22, FIG. 1, moved by the filmstrip to the controller 50, which is programmed to stop the bidirectional motor 42 after eight perforations have been detected. It should be readily apparent, however, that other input detection means can be used; for example, in lieu of using the photosensor 54, the controller 50 can be programmed to stop retraction based on the actual distance of filmstrip moved which can be detected based on time the motor is actuated, or by other distance measurement means, such as for filmstrips not having edge perforations. At the same time, the controller 50 also decrements the frame counter 64, FIG. 4, by a corresponding amount (in this particular embodiment by two frames) and resets the time-out flag 60. Once the motor 24 has retracted the unexposed portions of the filmstrip 20, the controller 50 allows the camera 10 to revert into the doze mode automatically without access to doze timer 62. It is also not required for the internal curl timer 58 to be reset.

Upon reawakening of the camera 10 (such as done in the present case by a user opening the lens cover (not shown)), the logic of the controller 50 first determines whether the time-out flag 60 has previously been tripped; that is, whether the internal timer 58 has already exceeded the predetermined amount of camera inactivity causing the unexposed portions of the filmstrip 20 to be moved from the transition area 30 back into the film cartridge 12. Alternatively, the camera 10 can be taken out of the doze mode by initiation of other camera functions, such as by activation of a zoom control switch (not shown) or other camera function switch, such as a trigger switch (not shown). Means for triggering and awakening a camera having a doze mode are conventionally known in the art, and as such do not form the essential teachings of the present invention.

Still referring to FIGS. 4–6(c), if the time-out flag 60 has previously been set, then the controller 50 is programmed to automatically send a signal to the camera advancing system 40, activating the bidirectional motor 42 in order to advance the filmstrip 20 in the film advance direction, as shown by arrow 34, by two frames, or by 16 perforations as detected by the photosensor 54 as shown in FIG. 6(c), thereby repositioning frame 6 back into the exposure gate 24. At the same time, the frame counter 64 is also incremented by two frames, and a signal is sent to the timing circuit 56 in order to reset the internal timer 58. The camera 10 is now ready to resume normal picture taking in which frame-by-frame advancing of the filmstrip 20 takes place via the film advancing mechanism 40 when the shutter release button 66, FIG. 1, is actuated by the user, as is conventionally known.

It should be readily apparent that though the described embodiment relates to a conventional film advancing camera, the present invention is also applicable to other camera systems, such as prewound cameras. Referring now to FIGS. 1, 2(b) and 7(a)–7(c), a camera 10 having a similar film advancing mechanism 40 is provided in which the filmstrip 20 is first prewound from the film cartridge 12 and onto the take-up spool 14 prior to exposure of the filmstrip. As per FIG. 2(b), a transition area 30 is defined along a film transport path 32 and adjacent the exposure gate 24. In order to avoid the onset of a reverse curl, the unexposed portions of the filmstrip 20, in this case frames 6 and 7 located in the transition area 30 and the exposure gate 24, can be rewound onto the take-up spool 14, FIGS. 7(a), 7(b), after a predetermined period of camera inactivity, in the manner described above automatically. Subsequently, the unexposed portions can then be advanced back to the exposure gate 24 and transition area 30, FIG. 7(c), when the camera 10 is reactivated by the user.

The invention has been described with reference to a preferred embodiment. However, it will be appreciated that variations and modifications can be effected by a person of ordinary skill in the art without departing from the intended scope of the claims. For example, it should also be readily apparent that though the present invention has been described using a conventional 35 mm film cartridge, other film cartridges, such as thrusting-type cartridges as described by commonly assigned U.S. patent application Ser. Nos. 4,887,110, and 4,991,786, among others, can easily be substituted.

PARTS LIST for FIGS. 1–7(c)

10 camera
12 film cartridge
13 body
14 take-up spool
15 film cartridge chamber
16 rotatable spool
17 take-up chamber
18 egress slot
20 filmstrip
22 edge perforations
24 exposure gate
26 pressure plate
28 camera rear cover
30 transition area
32 film transport path
34 arrow
36 arrow
40 film advancing mechanism
42 bidirectional motor
44 output shaft
46 pinion gear
48 gear train
50 controller
54 photosensor
56 timing circuit
58 internal curl timer
60 time-out flag
62 doze mode timer
64 frame counter
66 shutter release button

What is claimed is:

1. A photographic camera wherein successive unexposed sections of a filmstrip are exposed, is characterized by:

time determining means for determining a predetermined period of camera inactivity; and film moving means for moving an unexposed film section from a curl-developing area to a curl-defeating area after a predetermined period of camera inactivity as determined by said time determining means.

2. A camera as recited in claim 1, including an exposure gate at which successive unexposed sections of a filmstrip are exposed, and film advancing means for automatically advancing an unexposed film section from the curl-defeating area to said exposure gate upon reuse of said camera.

3. A camera as recited in claim 1, including an exposure gate, a body, and a film cartridge chamber and a take-up chamber contained within said body, wherein said curl-developing area is between said cartridge chamber and said exposure gate.

4. A camera as recited in claim 3, wherein said film moving means moves an unexposed film section from said curl-developing area to said film cartridge chamber.

5. A camera as recited in claim 3, wherein said curl-developing area is between said exposure gate and said take-up chamber.

\* \* \* \* \*